(12) United States Patent
Lu et al.

(10) Patent No.: US 10,989,205 B2
(45) Date of Patent: Apr. 27, 2021

(54) MICRO FAN

(71) Applicant: Delta Electronics, Inc., Taoyuan (TW)

(72) Inventors: Chao-Wen Lu, Taoyuan (TW);
Chih-Wei Chan, Taoyuan (TW);
Che-Wei Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/025,994

(22) Filed: Sep. 18, 2020

(65) Prior Publication Data
US 2021/0003136 A1  Jan. 7, 2021

Related U.S. Application Data

(63) Continuation-in-part of application No. 15/467,285, filed on Mar. 23, 2017, now abandoned.

(60) Provisional application No. 62/366,184, filed on Jul. 25, 2016.

(51) Int. Cl.
| | |
|---|---|
| *H02K 7/14* | (2006.01) |
| *F04D 25/06* | (2006.01) |
| *F04D 29/64* | (2006.01) |
| *H02K 15/02* | (2006.01) |
| *F04D 19/00* | (2006.01) |

(52) U.S. Cl.
CPC ....... *F04D 25/0606* (2013.01); *F04D 29/644* (2013.01); *H02K 7/14* (2013.01); *H02K 15/02* (2013.01); *F04D 19/002* (2013.01); *F05B 2230/60* (2013.01); *F05B 2250/82* (2013.01)

(58) Field of Classification Search
CPC .. F04D 25/0606; F04D 29/644; F04D 19/002; H02K 7/14; H02K 15/02; F05B 2230/60; F05B 2250/82
USPC ...................................................... 417/410.1
See application file for complete search history.

(56) References Cited

U.S. PATENT DOCUMENTS

| | | | |
|---|---|---|---|
| 4,504,751 | A | 3/1985 | Meier |
| 5,793,133 | A | 8/1998 | Shiraki et al. |
| 6,486,763 | B1 | 11/2002 | Kummel |
| 7,518,282 | B2 | 4/2009 | Park et al. |
| 7,635,929 | B2 | 12/2009 | Shikayama et al. |
| 8,378,539 | B2 | 2/2013 | Kanai |
| 8,476,800 | B2 | 7/2013 | Lai et al. |
| 2006/0227455 | A1* | 10/2006 | Tamaoka ............ G11B 19/2009 360/99.08 |
| 2007/0104593 | A1* | 5/2007 | Yamaguchi ............ F04D 29/281 417/354 |
| 2008/0216305 | A1 | 9/2008 | Furuya |
| 2008/0309443 | A1* | 12/2008 | Furuya .................. H01F 17/045 336/83 |
| 2010/0314974 | A1 | 12/2010 | Horng |
| 2011/0110800 | A1 | 5/2011 | Lai et al. |
| 2016/0126006 | A1 | 5/2016 | Ahn et al. |

\* cited by examiner

*Primary Examiner* — Terrance L Kenerly
(74) *Attorney, Agent, or Firm* — Muncy, Geissler, Olds & Lowe, P.C.

(57) ABSTRACT

A micro fan is provided. The micro fan includes a rotor and a stator. The stator includes an axial induced coil unit and a circuit board. The axial induced coil unit is made by twining a coil in an axial direction for at least two layers and in a radial direction for at least two layers.

14 Claims, 11 Drawing Sheets

MICRO FAN

CROSS REFERENCE TO RELATED APPLICATIONS

This application is a Continuation-In-Part of pending U.S. patent application Ser. No. 15/467,285, filed Mar. 23, 2017 and entitled "micro fan", which claims the benefit of U.S. Provisional Application No. 62/366,184, filed Jul. 25, 2016, the entirety of which is incorporated by reference herein.

BACKGROUND OF THE INVENTION

Field of the Invention

The present invention relates to a micro fan, and in particular to a micro fan that can be produced in an automated process.

Description of the Related Art

Conventionally, to produce a micro fan, a stator of the micro fan is produced by winding a coil on a lead of a silicon steel element, and then the stator is manually positioned and welded to a circuit board. However, this process cannot be utilized to produce a micro fan with a thickness of less than 4 mm.

In another conventional production process, the stator of the micro fan is produced by winding a coil on a silicon steel element, and then the stator is manually plugged into a bearing sleeve, and the coil of the stator is welded to a circuit board. Similarly, this process cannot be utilized to produce a micro fan with a thickness of less than 4 mm. Additionally, structural interference or poor welding may occur due to human error.

BRIEF SUMMARY OF THE INVENTION

In one embodiment, a micro fan is provided. The micro fan includes a rotor and a stator. The stator includes an axial induced coil unit and a circuit board. The axial induced coil unit is made by twining a coil in an axial direction for at least two layers and in a radial direction for at least two layers.

In another embodiment, a micro fan is provided. The micro fan includes a rotor and a stator. The stator includes an axial induced coil unit and a circuit board. The axial induced coil unit is made by twining a coil into a flat-shaped bundle.

In another embodiment, a micro fan is provided. The micro fan includes a rotor and a stator. The stator includes an axial induced coil unit and a circuit board. The stator is produced by the following steps. First, the axial induced coil unit is provided. Then, the axial induced coil unit is mounted directly on the circuit board by surface mount technology, and the axial induced coil unit is a magnetic pole unit of the stator.

In one embodiment, the axial induced coil unit is made by twining a coil in a radial direction for multilayers.

In one embodiment, the axial induced coil unit is made by twining a coil in a radial direction for multilayers and in an axial direction for multilayers.

In one embodiment, the axial induced coil unit is made by twining a coil into a circular-shaped bundle.

In one embodiment, the axial induced coil unit is made by twining a coil into a flat-shaped bundle.

In one embodiment, there is no magnetic conduction element disposed in the center of the axial induced coil unit.

In one embodiment, the stator further comprises a bearing, and the bearing passes through the center of the circuit board.

In one embodiment, the micro fan further comprises a fan frame, wherein the rotor is disposed on the fan frame, and the stator is affixed to the fan frame.

In one embodiment, the micro fan further comprises a magnetic conduction sheet, wherein the magnetic conduction sheet is disposed on the fan frame and corresponds to the axial induced coil unit.

In one embodiment, the rotor comprises a magnetic ring, a magnetic conduction shield, and a plurality of blades. The magnetic conduction shield is disposed between the magnetic ring and the blades. The magnetic conduction shield comprises a shaft, and the shaft passes through the bearing.

In one embodiment, the micro fan further comprises a wear-resistant pad, wherein the wear-resistant pad is disposed on the fan frame, and the shaft abuts the wear-resistant pad.

In one embodiment, the stator further comprises a micro controller, and the micro controller is disposed on the circuit board.

In one embodiment, the two ends of the axial induced coil unit are formed by two connection terminals.

In another embodiment, a micro fan is provided. The micro fan includes a rotor and a stator. The stator includes a plurality of axial induced coil units and a circuit board. The axial induced coil units are respectively preformed as a plurality of stator magnetic pole units, and are coupled to the circuit board. At least one of the coil units comprises a coil and an insulation material. The insulation material is block-shaped and covers at least a portion of the coil, and the central axis of the coil is parallel to the shaft of the rotor.

In one embodiment, at least one of the axial induced coil units is made by the following steps. First, the coil is formed. Then, the coil is put on a lead frame. Next, the coil and a portion of the lead frame are covered with the block-shaped insulation material. Then, the lead frame is cut off.

In one embodiment, at least one end of at least one of the axial induced coil units is formed by the lead frame.

In one embodiment, at least one of the axial induced coil units is coupled to the circuit board by surface mount technology.

In one embodiment, at least one of the axial induced coil units is made by the following steps. First, the coil is formed. Then, the coil is covered with the block-shaped insulation material, wherein two ends of the coil are exposed.

In one embodiment, at least one of the axial induced coil units is made by the following steps. First, the coil is formed. Then, a first end of the coil is connected to a first terminal structure, and a second end of the coil is connected to a second terminal structure. Next, the coil is covered with the block-shaped insulation material, wherein at least a portion of the first terminal structure and at least a portion of the second terminal structure are exposed.

In one embodiment, there is no magnetic conduction element disposed in the center of the axial induced coil unit.

In another embodiment, a micro fan is provided. The micro fan includes a rotor and a stator. The stator includes a plurality of axial induced coil units and a circuit board. The axial induced coil units are coupled to the circuit board, at least one of the axial induced coil units is formed by covering a coil with a block-shaped insulation material, and the central axis of the coil is parallel to the shaft of the rotor.

In another embodiment, a micro fan is provided. The micro fan includes a rotor and a stator. The stator includes a plurality of axial induced coil units and a circuit board. At least one of the axial induced coil units is formed by a block-shaped insulation body, a coil, and at least two terminals. The coil is covered by the block-shaped insulation body. One end of the terminal is electrically connected to an end of the coil. The other end of the terminal is electrically connected to circuit board.

In one embodiment, the terminals and the coil can be formed integrally or separately.

Utilizing the micro fan of the embodiment of the invention, the problem of poor assembling accuracy due to manual assembly is prevented. Additionally, the micro fan of the embodiments of the invention can be produced by an automated process which reduces the labor time, reduces the required manpower, and enhances productivity. The micro fan (or motor) utilizing the embodiment of the invention can achieve improved performance without increasing the dimensions.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
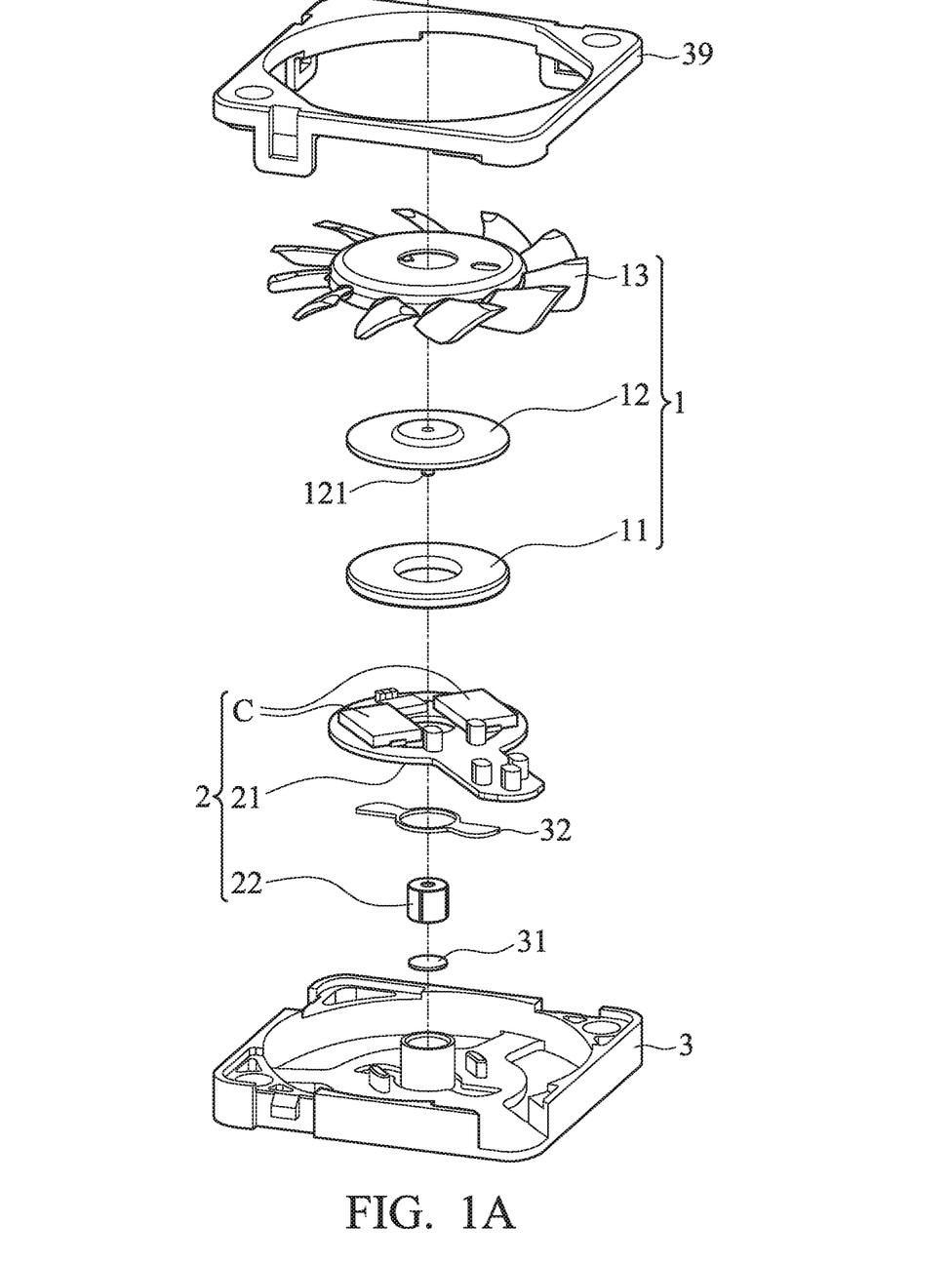
FIG. 1A is an exploded view of the micro fan of an embodiment of the invention.
Figure 1B:
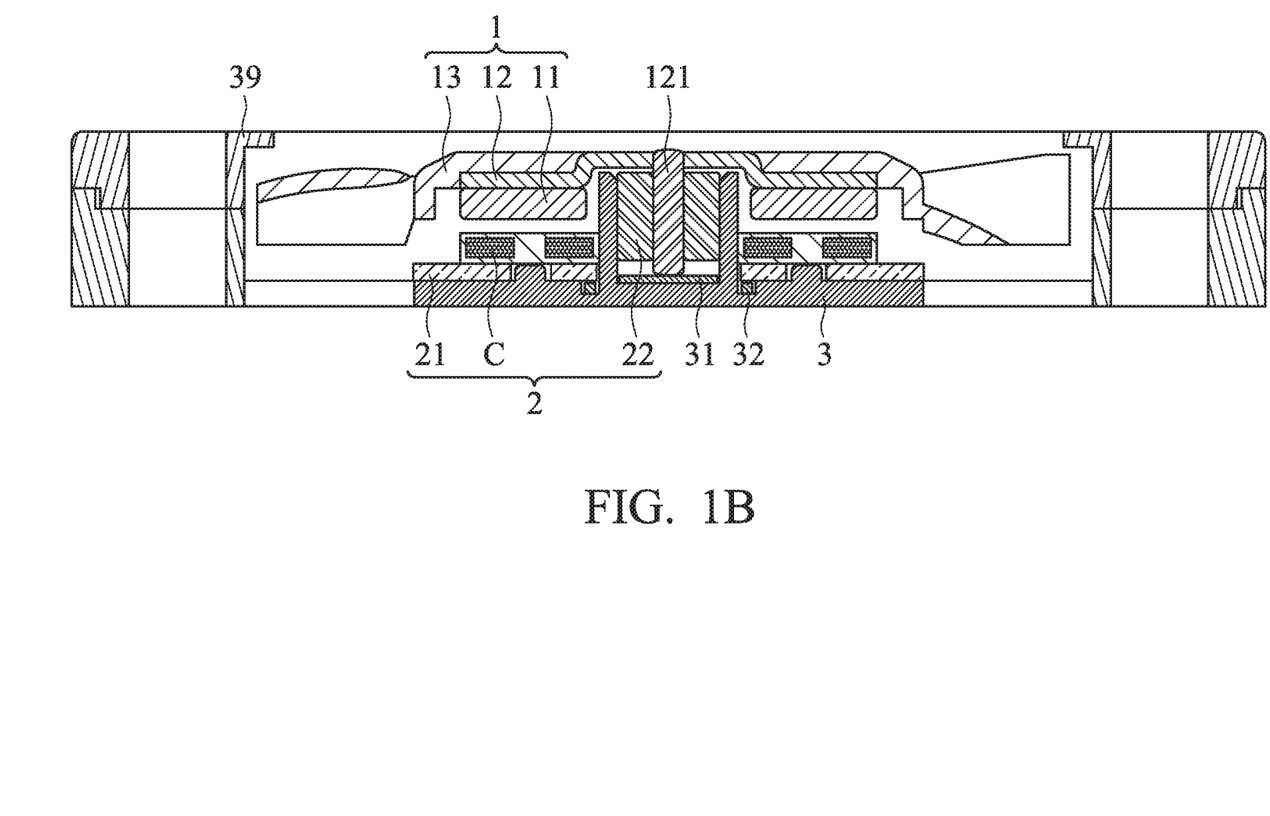
FIG. 1B is a cross sectional view of the micro fan of an embodiment of the invention.

FIGS. 1A and 1B shows a micro fan F of an embodiment of the invention, including a rotor 1 and a stator 2. The stator 2 includes a coil unit C and a circuit board 21. In one embodiment, the coil unit C is an axial induced coil unit. In this embodiment, the rotor 1 comprises a magnetic ring 11, a magnetic conduction 12 shield, and a plurality of blades 13. The magnetic conduction shield 12 is disposed between the magnetic ring 11 and the blades 13. The stator 2 further comprises a bearing 22, and the bearing 22 passes through the center of the circuit board 21. The magnetic conduction shield 12 comprises a shaft 121, and the shaft 121 passes through the bearing 22.

With reference to FIGS. 1A and 1B, in one embodiment, the micro fan F further comprises a fan frame 3, wherein the rotor 1 is disposed on the fan frame 3, and the stator 2 is affixed to the fan frame 3. The micro fan F further comprises a wear-resistant pad 31, the wear-resistant pad 31 is disposed on the fan frame 3, and the shaft 121 abuts the wear-resistant pad 31. In this embodiment, the fan frame 3 is assembled with a cover 39.

With reference to FIGS. 1A and 1B, in one embodiment, the micro fan F further comprises a magnetic conduction sheet 32, wherein the magnetic conduction sheet 32 is disposed on the fan frame 3 and corresponds to the coil unit C. The magnetic conduction sheet 32 modifies the distribution of the magnetic lines of force to improve the magnetic induction effect.

Figure 2:
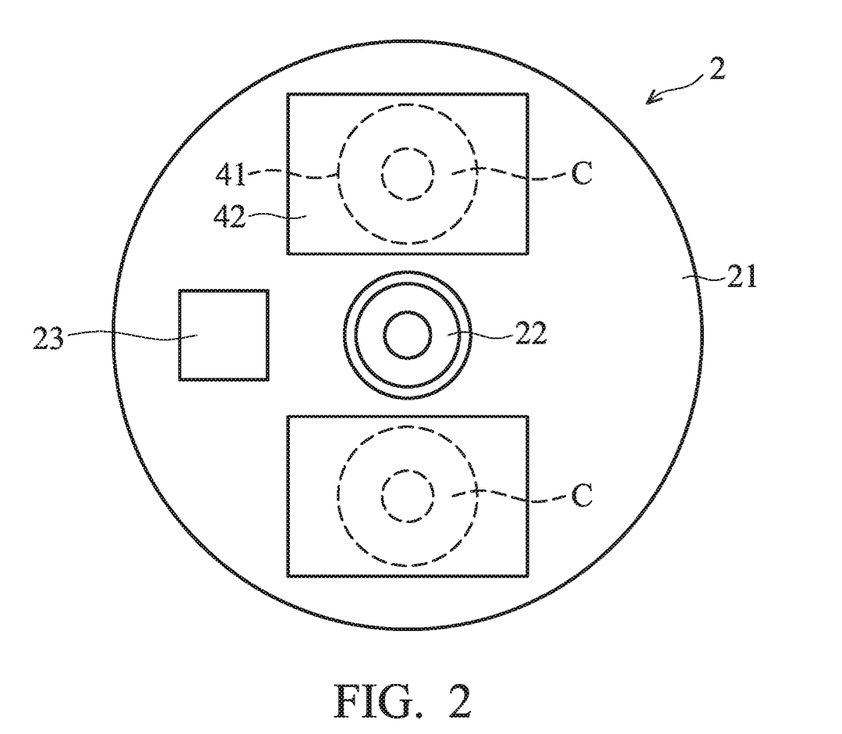
FIG. 2 shows details of the structure of the stator of an embodiment of the invention.

FIG. 2 shows a detailed structure of the stator 2 of an embodiment of the invention, wherein the stator 2 further comprises a micro controller 23, and the micro controller 23 is disposed on the circuit board 21.

Figure 3:
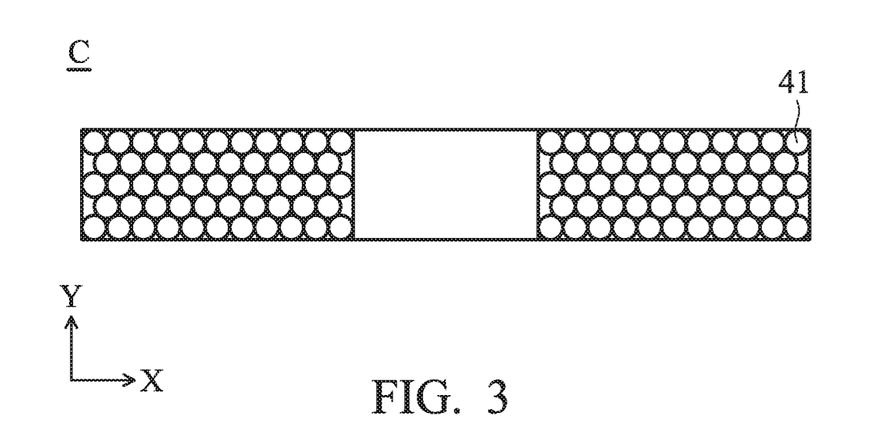
FIG. 3 shows details of the structure of the coil unit of an embodiment of the invention.

FIG. 3 shows details of the structure of the coil unit C of an embodiment of the invention. In one embodiment, the coil unit C is made by twining a coil in a radial direction for multilayers. The coil unit C is made by twining the coil in the radial direction (X direction) for at least two layers. In this embodiment, the coil unit C is made by twining a coil in a radial direction for multilayers and in the axial direction for multilayers. The coil unit C is made by twining the coil in the axial direction (Y direction) for at least two layers and in the radial direction (X direction) for at least two layers. In one embodiment, the coil unit C is made by twining a coil 41 into a flat-shaped bundle. In this embodiment, the coil unit C is made by twining a coil 41 into a circular-shaped bundle. Therefore, the coil density is increased, and the dimensions of the coil unit C are reduced.

With reference to FIG. 2, in one embodiment, the coil units C are respectively preformed as a plurality of stator magnetic pole units, and are coupled to the circuit board 21. At least one of the coil units C comprises a coil 41 and an insulation material 42. The insulation material 42 is a block-shaped and covers at least a portion of the coil 41. The central axis of the coil 41 is parallel to the shaft of the rotor.

Figure 4A:
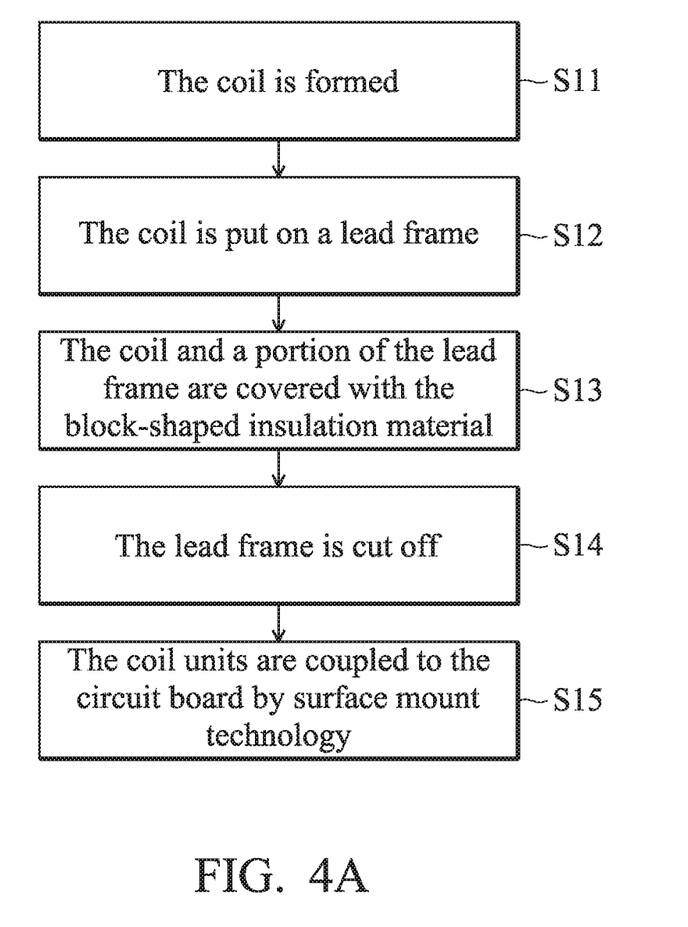
FIG. 4A shows a method for producing the coil unit of an embodiment of the invention.
Figure 4B:
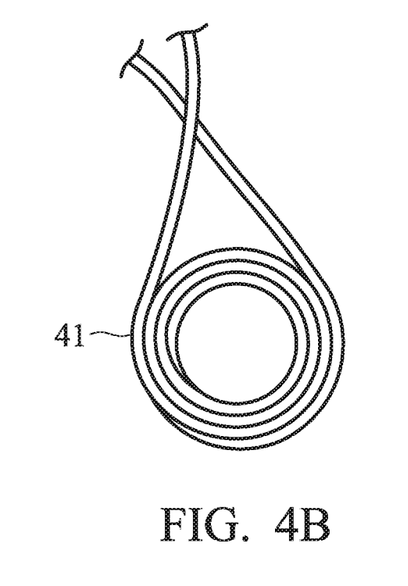
FIGS. 4B, 4C, 4D, 4E and 4F show each step in the method of FIG. 4A.
Figure 4C:
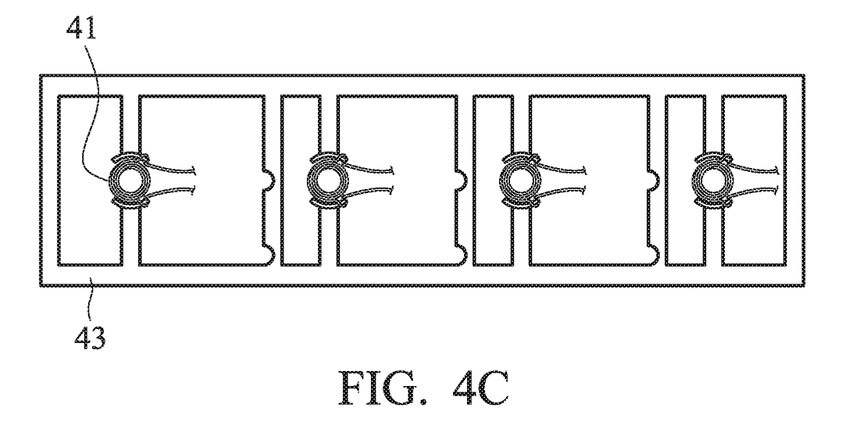
Figure 4D:
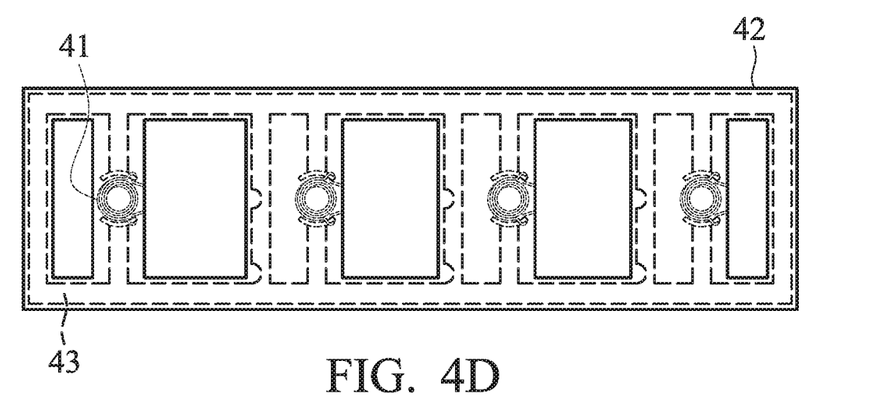
Figure 4E:
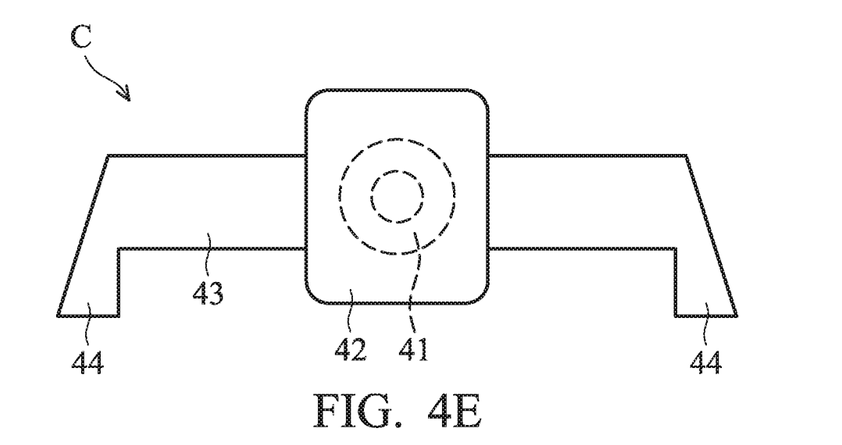
Figure 4F:
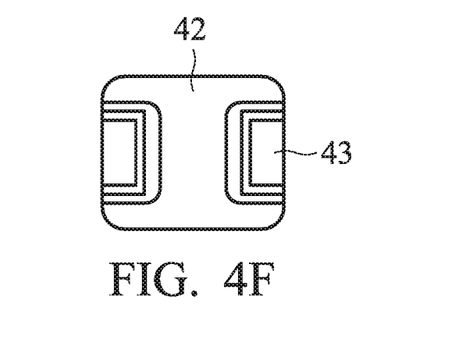

With reference to FIG. 4A, in one embodiment, at least one of the coil units C is made by the following steps. First, the coil 41 is formed (S11, with reference to FIG. 4B). Then, the coil 41 is put on a lead frame 43 (S12, with reference to FIG. 4C). Next, the coil 41 and a portion of the lead frame 43 are covered with the block-shaped insulation material 42 (S13, with reference to FIG. 4D). Then, the lead frame 43 is cut off (S14, with reference to FIG. 4E). With reference to FIG. 4E, in this embodiment, at least one end 44 of at least one of the coil units C is formed by the lead frame. Next, the coil units C are coupled to the circuit board by surface mount technology (S15). With reference to FIG. 4F, the end 44 of the coil unit C can be bent. In one embodiment, there is no magnetic conduction element disposed in the center of the coil unit C. Utilizing the process of the embodiment above, the stator can be produced by an automated process.

Figure 5:
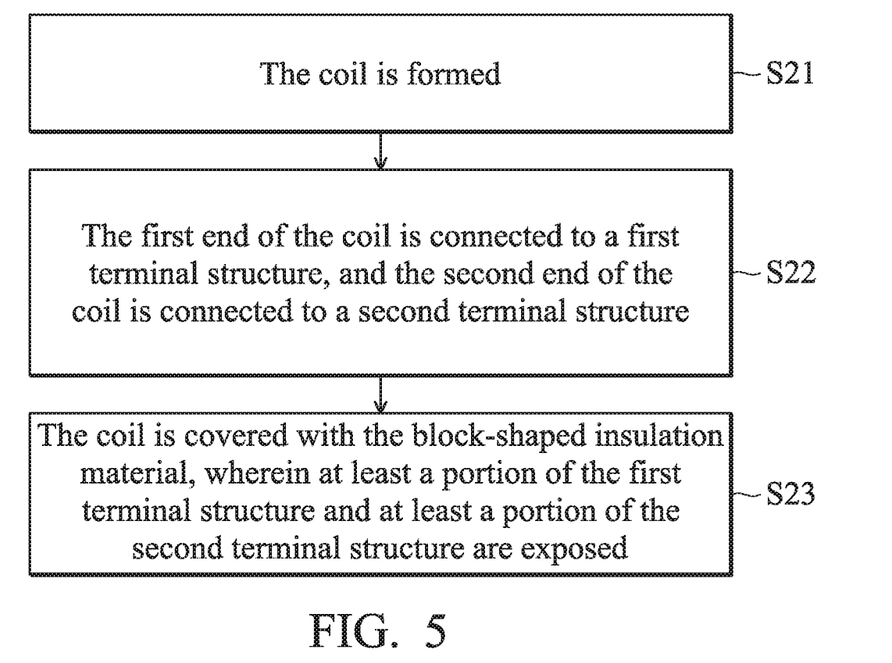
FIG. 5 shows a method for producing the coil unit of another embodiment of the invention.

With reference to FIG. 5, in another embodiment, at least one of the coil units C is made by the following steps. First, the coil is formed (S21). Then, the first end of the coil is connected to a first terminal structure, and the second end of the coil is connected to a second terminal structure (S22). Next, the coil is covered with the block-shaped insulation material, wherein at least a portion of the first terminal structure and at least a portion of the second terminal structure are exposed (S23). Like the embodiment disclosed in FIG. 4E, the terminal structure can be similar to the structure of the end 44 of the coil unit C, can be a portion of the lead frame, or can be another terminal structure with conductivity. Utilizing the process of the embodiment above, the stator can be produced by an automated process.

With reference to FIG. 2, the coil units C are coupled to the circuit board 21. At least one of the coil units C is formed by covering a coil 41 with a block-shaped insulation material 42. The central axis of the coil 41 is parallel to the shaft of the rotor.

With reference to FIG. 2, at least one of the coil units C is formed by a block-shaped insulation body 42, a coil 41 and at least two terminals. The coil 41 is covered by the block-shaped insulation body 42. One end of the terminal is electrically connected to one end of the coil 41. The other end of the terminal is electrically connected to the circuit board 21. In one embodiment, the terminals and the coil 41 can be formed integrally or separately.

Figure 6A:
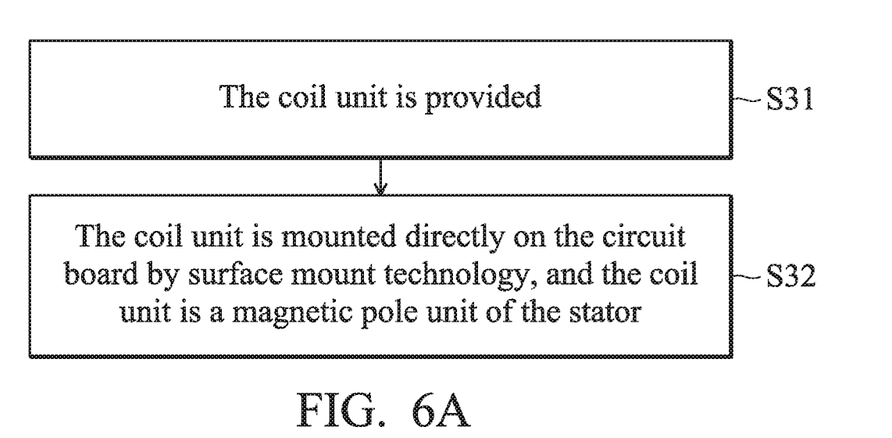
FIG. 6A shows a method for producing the coil unit of another embodiment of the invention.
Figure 6B:
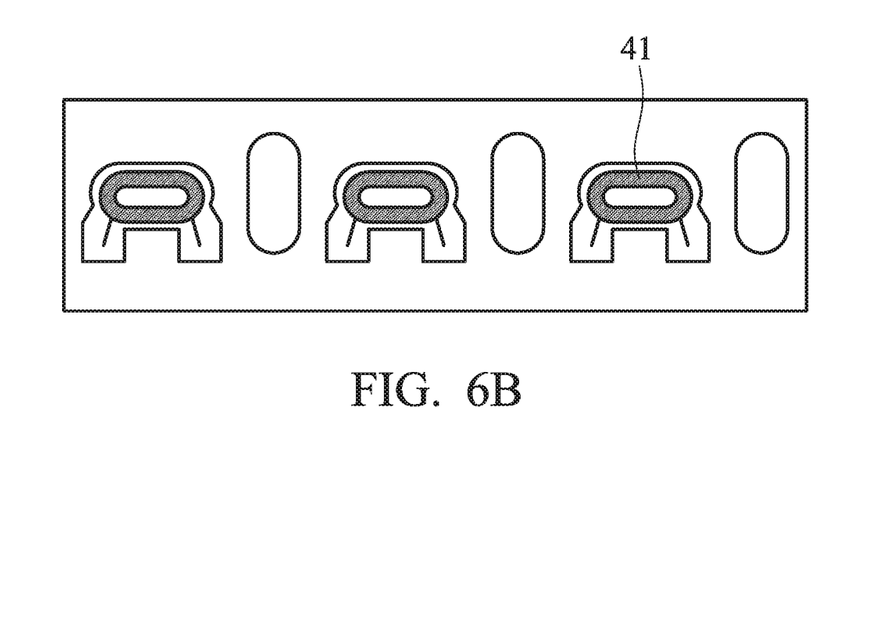
FIGS. 6B, and 6C show each steps of the method of FIG. 6A.
Figure 6C:
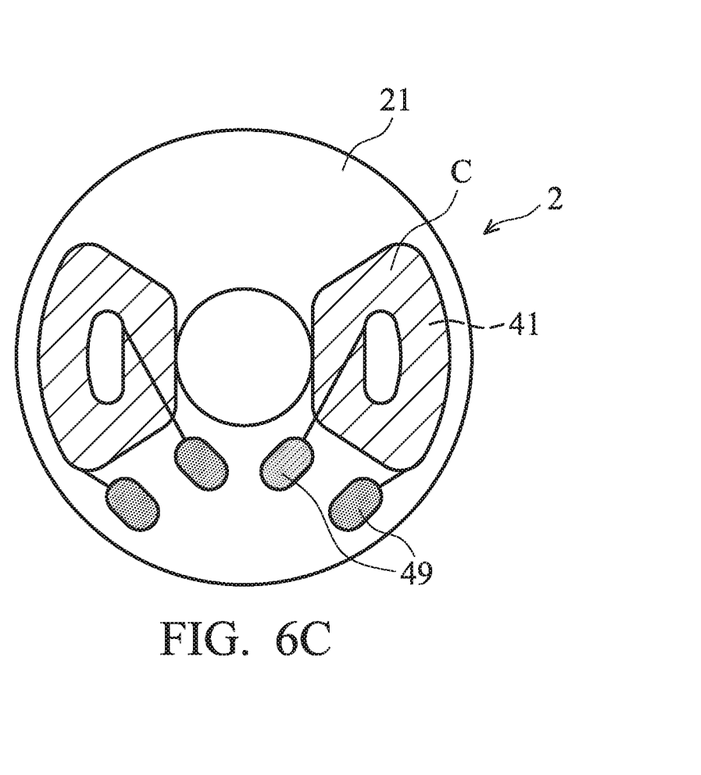

FIG. 6A shows the steps to produce the stator of an embodiment of the invention. First, the coil unit is provided (S31). Then, the coil unit is mounted directly on the circuit board by surface mount technology, and the coil unit is a magnetic pole unit of the stator (S32). FIG. 6B shows the coil 41 of the coil unit C disposed on a substrate strip. FIG. 6C shows the coil unit C mounted on the circuit board 21 by surface mount technology. Utilizing the process of the embodiment above, the stator can be produced by an automated process.

With reference to FIG. 6B, in this embodiment, there is no magnetic conduction element disposed in the center of the coil unit C. The two ends of the coil unit C are formed by two connection terminals 49. The connection terminals 49 can be metal conductive elements.

Figure 7:
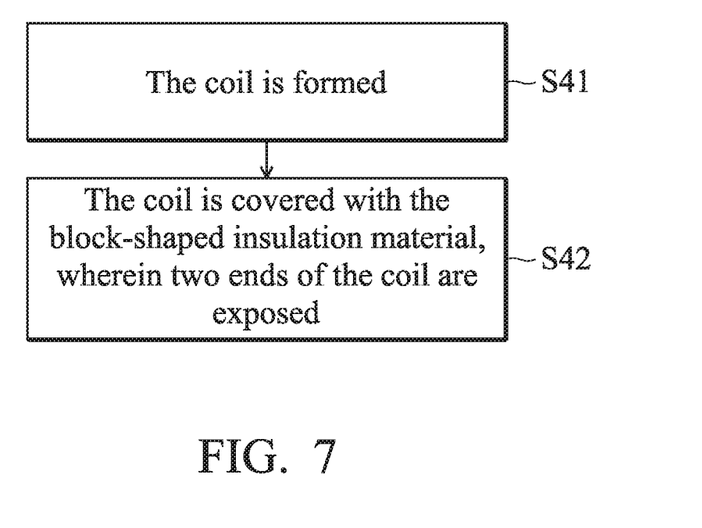
FIG. 7 shows a method for producing the coil unit of another embodiment of the invention, wherein two ends of the coil are exposed.

FIG. 7 shows the steps to produce the stator of an embodiment of the invention. First, the coil is formed (S41). Then, the coil is covered with the block-shaped insulation material, wherein two ends of the coil are exposed (S42). Utilizing the process of the embodiment above, the stator can be produced by an automated process.

In the embodiments of the invention, the stator has a stator coil magnetic pole. The stator coil magnetic pole provides a magnetic attraction force and a magnetic repulsion force alternately toward rotor magnets of the rotor to rotate the rotor (when the direction of the stator coil magnetic pole current changes, the magnetic force is changed between the magnetic attraction force and magnetic repulsion force).

Figure 8A:
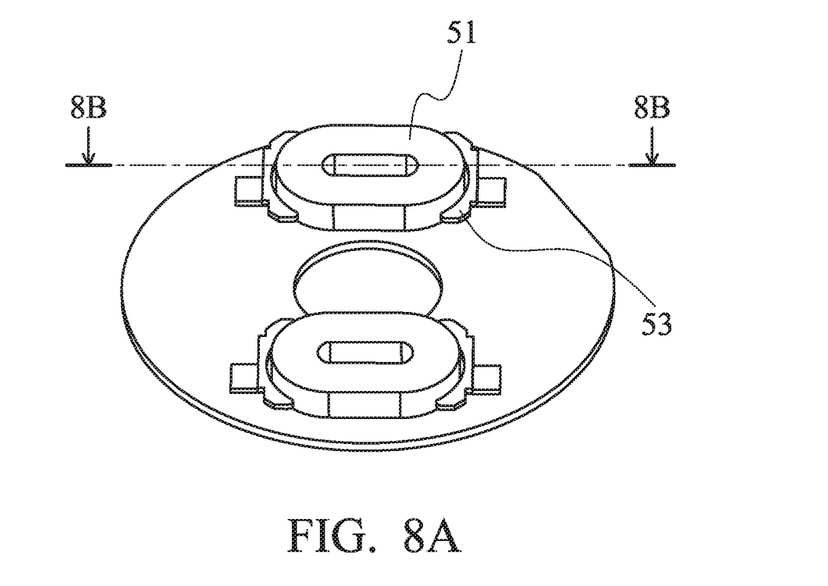
FIG. 8A shows a coil and a lead frame of another embodiment of the invention.
Figure 8B:
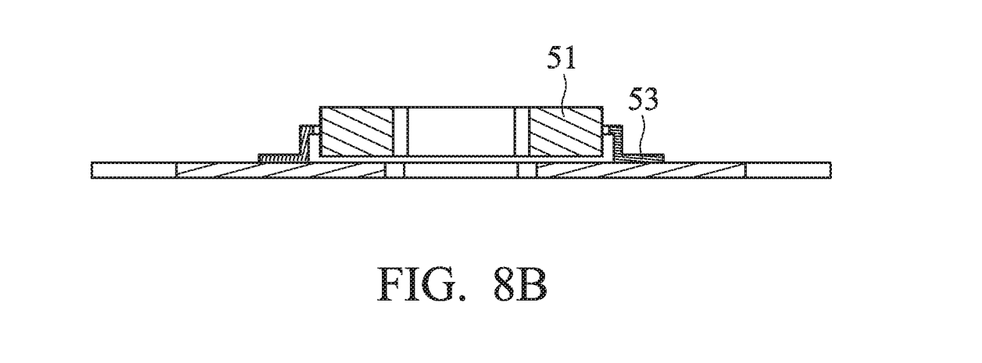
FIG. 8B is a cross sectional view along direction 8B-8B portion of FIG. 8A.
Figure 9A:
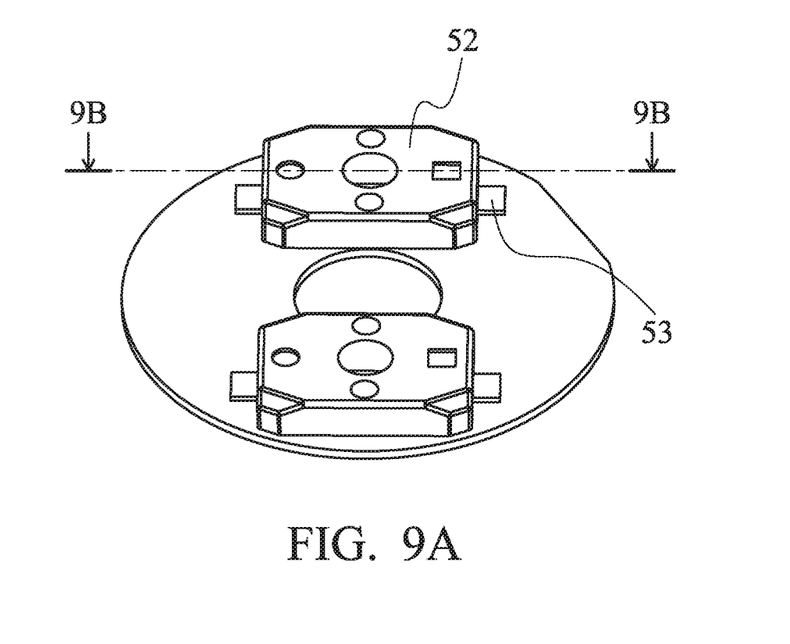
FIG. 9A shows a non-magnetically-conductive material of another embodiment of the invention.
Figure 9B:
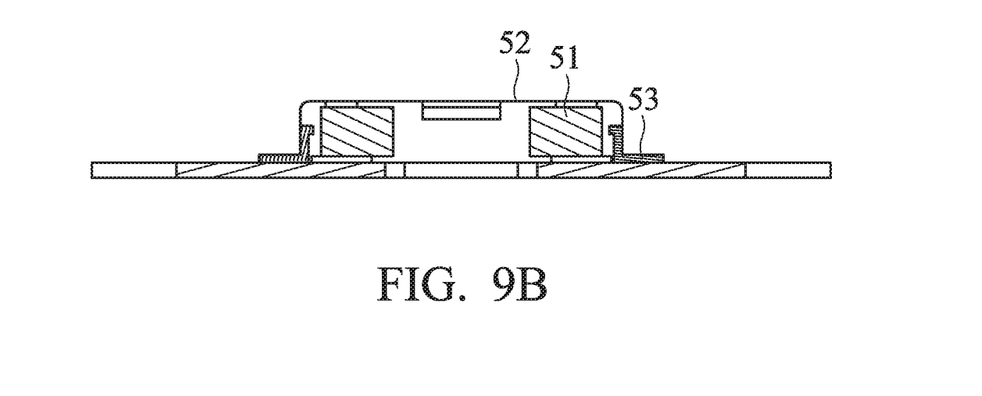
FIG. 9B is a cross sectional view along direction 9B-9B portion of FIG. 9A.

With reference to FIGS. 8A and 8B, in one embodiment, a coil 51 is put on a lead frame 53. The coil 51 welded to the lead frame 53. With reference to FIGS. 9A and 9B, then, a non-magnetically-conductive material 52 covers the coil 51. The non-magnetically-conductive material 52 covers the coil 51 to prevent the magnetic line of the coil 51 from being insulated. The magnetic force of the coil 51 can be applied to the magnets of the rotor, and to rotate the rotor.

Utilizing the micro fan of the embodiment of the invention, the problem of poor assembling accuracy due to manual assembly is prevented. Additionally, the micro fan of the embodiments of the invention can be produced by an automated process which reduces the labor time, reduces the required manpower, and enhances productivity. The micro fan (or motor) utilizing the embodiment of the invention can achieve improved performance without increasing the dimensions.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro fan, comprising:
   a rotor; and
   a stator, comprising an axial induced coil unit and a circuit board, wherein the axial induced coil unit is made by twining a coil in an axial direction for at least two layers and in a radial direction for at least two layers,
   wherein an end contact of the axial induced coil unit, which is connected to one end of the coil, is cut from a lead frame,
   wherein the axial induced coil unit generate an magnetic force to rotate the rotor,
   wherein the stator has a stator coil magnetic pole, and the stator coil magnetic pole provides a magnetic attraction force and a magnetic repulsion force alternately toward rotor magnets of the rotor to rotate the rotor,
   wherein the stator further comprises a bearing, and the bearing passes through a center of the circuit board,
   wherein the rotor comprises a magnetic ring, a magnetic conduction shield and a plurality of blades, the magnetic conduction shield is disposed between the magnetic ring and the blades, the magnetic conduction shield comprises a shaft, and the shaft passes through the bearing.

2. A micro fan, comprising:
   a rotor; and
   a stator, comprising an axial induced coil unit and a circuit board, wherein the axial induced coil unit is made by twining a coil into a flat-shaped bundle,
   wherein an end contact of the axial induced coil unit, which is connected to one end of the coil, is cut from a lead frame,
   wherein the axial induced coil unit generate an magnetic force to rotate the rotor,
   wherein the stator has a stator coil magnetic pole, and the stator coil magnetic pole provides a magnetic attraction force and a magnetic repulsion force alternately toward rotor magnets of the rotor to rotate the rotor,
   wherein the stator further comprises a bearing, and the bearing passes through a center of the circuit board,
   wherein the rotor comprises a magnetic ring, a magnetic conduction shield and a plurality of blades, the magnetic conduction shield is disposed between the magnetic ring and the blades, the magnetic conduction shield comprises a shaft, and the shaft passes through the bearing.

3. A micro fan, comprising:

a rotor; and a stator, comprising an axial induced coil unit and a circuit board, wherein the stator is produced by the following steps:

providing the axial induced coil unit;

directly mounting the axial induced coil unit on the circuit board by surface mount technology, and the axial induced coil unit is a magnetic pole unit of the stator, wherein an end contact of the axial induced coil unit, which is connected to one end of the coil, is cut from a lead frame, wherein the axial induced coil unit generate an magnetic force to rotate the rotor, wherein the stator has a stator coil magnetic pole, and the stator coil magnetic pole provides a magnetic attraction force and a magnetic repulsion force alternately toward rotor magnets of the rotor to rotate the rotor, wherein the stator further comprises a bearing, and the bearing passes through a center of the circuit board, wherein the rotor comprises a magnetic ring, a magnetic conduction shield and a plurality of blades, the magnetic conduction shield is disposed between the magnetic ring and the blades, the magnetic conduction shield comprises a shaft, and the shaft passes through the bearing.

4. The micro fan as claimed in claim 3, wherein the axial induced coil unit is made by twining a coil in a radial direction for multilayers.

5. The micro fan as claimed in claim 3, wherein the axial induced coil unit is made by twining a coil in a radial direction for multilayers and in an axial direction for multilayers.

6. The micro fan as claimed in claim 3, wherein the axial induced coil unit is made by twining a coil into a circular-shaped bundle.

7. The micro fan as claimed in claim 3, wherein the axial induced coil unit is made by twining a coil into a flat-shaped bundle.

8. The micro fan as claimed in claim 3, wherein there is no magnetic conduction element disposed in a center of the axial induced coil unit.

9. The micro fan as claimed in claim 3, further comprising a fan frame, wherein the rotor is disposed on the fan frame, and the stator is affixed to the fan frame.

10. The micro fan as claimed in claim 9, further comprising a magnetic conduction sheet, wherein the magnetic conduction sheet is disposed on the fan frame and corresponds to the axial induced coil unit.

11. The micro fan as claimed in claim 3, further comprising a wear-resistant pad, wherein the wear-resistant pad is disposed on the fan frame, and the shaft abuts the wear-resistant pad.

12. The micro fan as claimed in claim 3, wherein the stator further comprises a micro controller, and the micro controller is disposed on the circuit board.

13. The micro fan as claimed in claim 3, wherein the two ends of the axial induced coil unit are formed by two connection terminals.

14. The micro fan as claimed in claim 1, wherein the magnetic force is switched between a magnetic attraction force and a magnetic repulsion force.

* * * * *